United States Patent [19]

Hulett et al.

[11] Patent Number: 4,580,213
[45] Date of Patent: Apr. 1, 1986

[54] MICROPROCESSOR CAPABLE OF AUTOMATICALLY PERFORMING MULTIPLE BUS CYCLES

[75] Inventors: Terry V. Hulett; William C. Moyer, both of Austin; Bradly A. Setering, Round Rock; Michael E. Spak, Kyle, all of Tex.

[73] Assignee: Motorola, Inc., Schaumburg, Ill.

[21] Appl. No.: 395,957

[22] Filed: Jul. 7, 1982

[51] Int. Cl.[4] ............................................ G06F 11/00
[52] U.S. Cl. .................................................. 364/200
[58] Field of Search ............................... 364/200, 900

[56] References Cited

U.S. PATENT DOCUMENTS 4,348,722 9/1982 Gunter et al. ....................... 364/200

Primary Examiner—Gareth D. Shaw
Assistant Examiner—Samir Jaser
Attorney, Agent, or Firm—Anthony J. Sarli, Jr.; Jeffrey Van Myers

[57] ABSTRACT

A microprocessor is disclosed having a bus controller which is capable of automatically performing multiple bus cycles in response to a multi-cycle signal received from the control unit. The bus controller includes means for automatically incrementing the access address provided by the control unit, and for controlling the transfer of the data between the bus and respective destinations in the control units.

6 Claims, 7 Drawing Figures

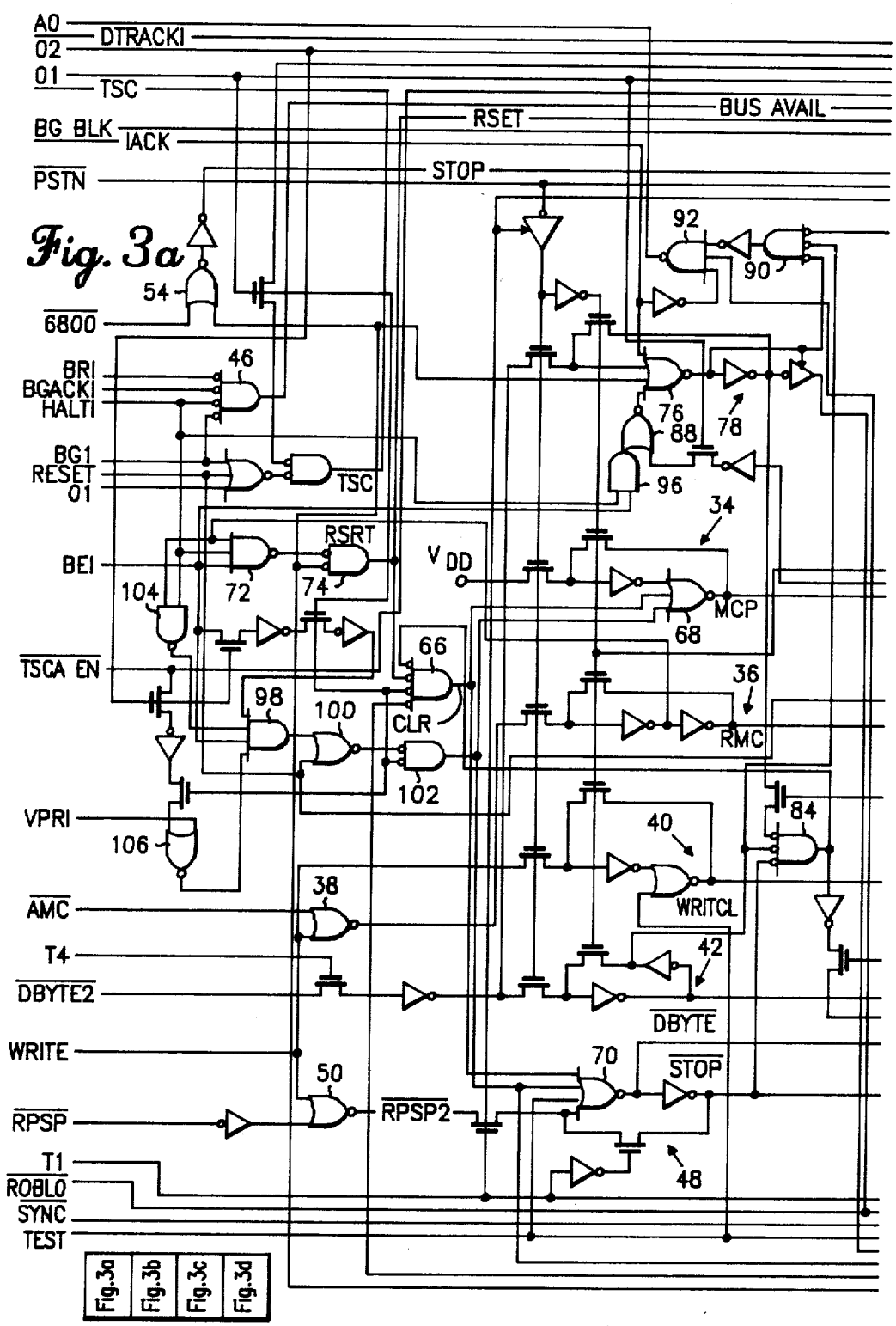

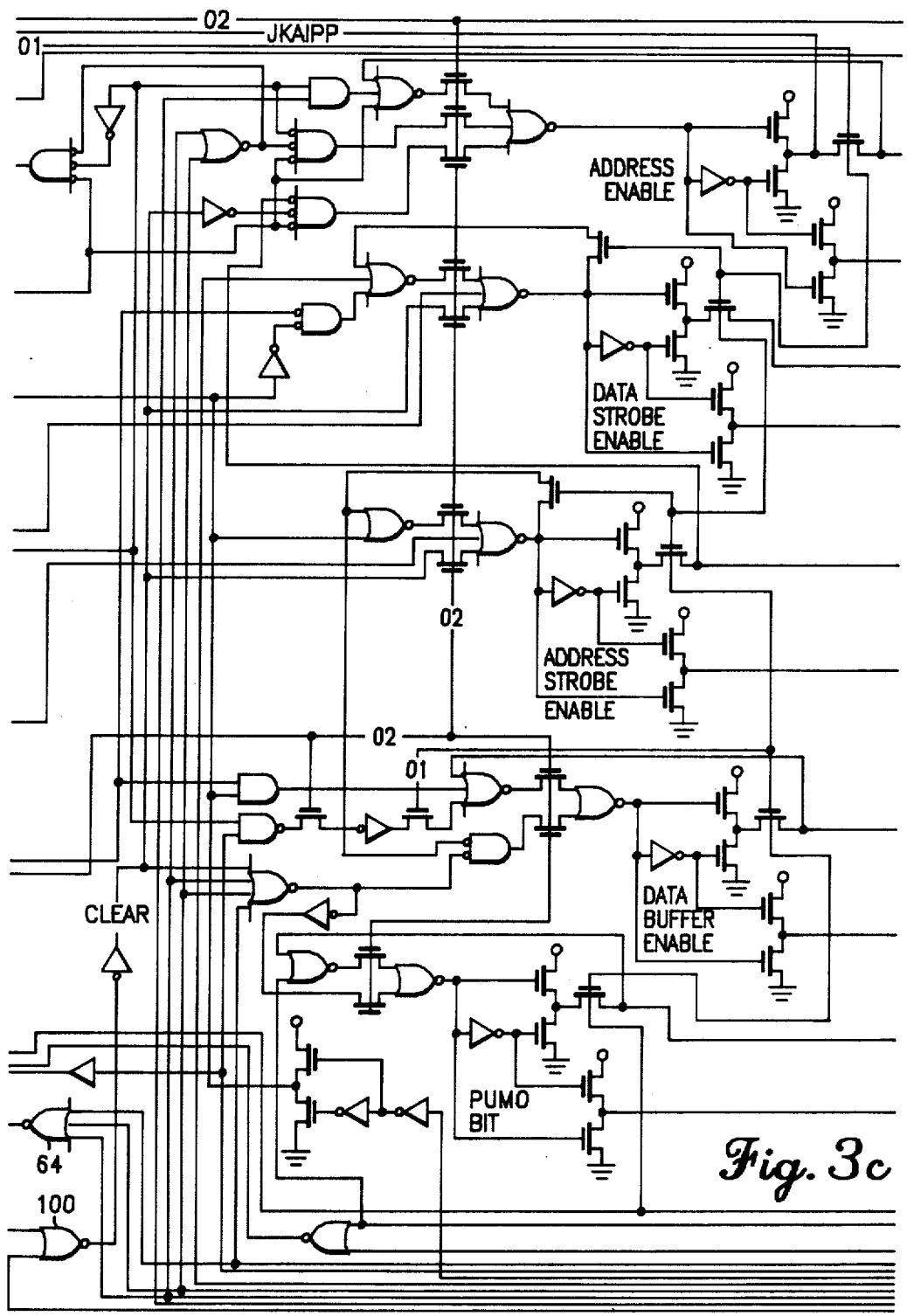

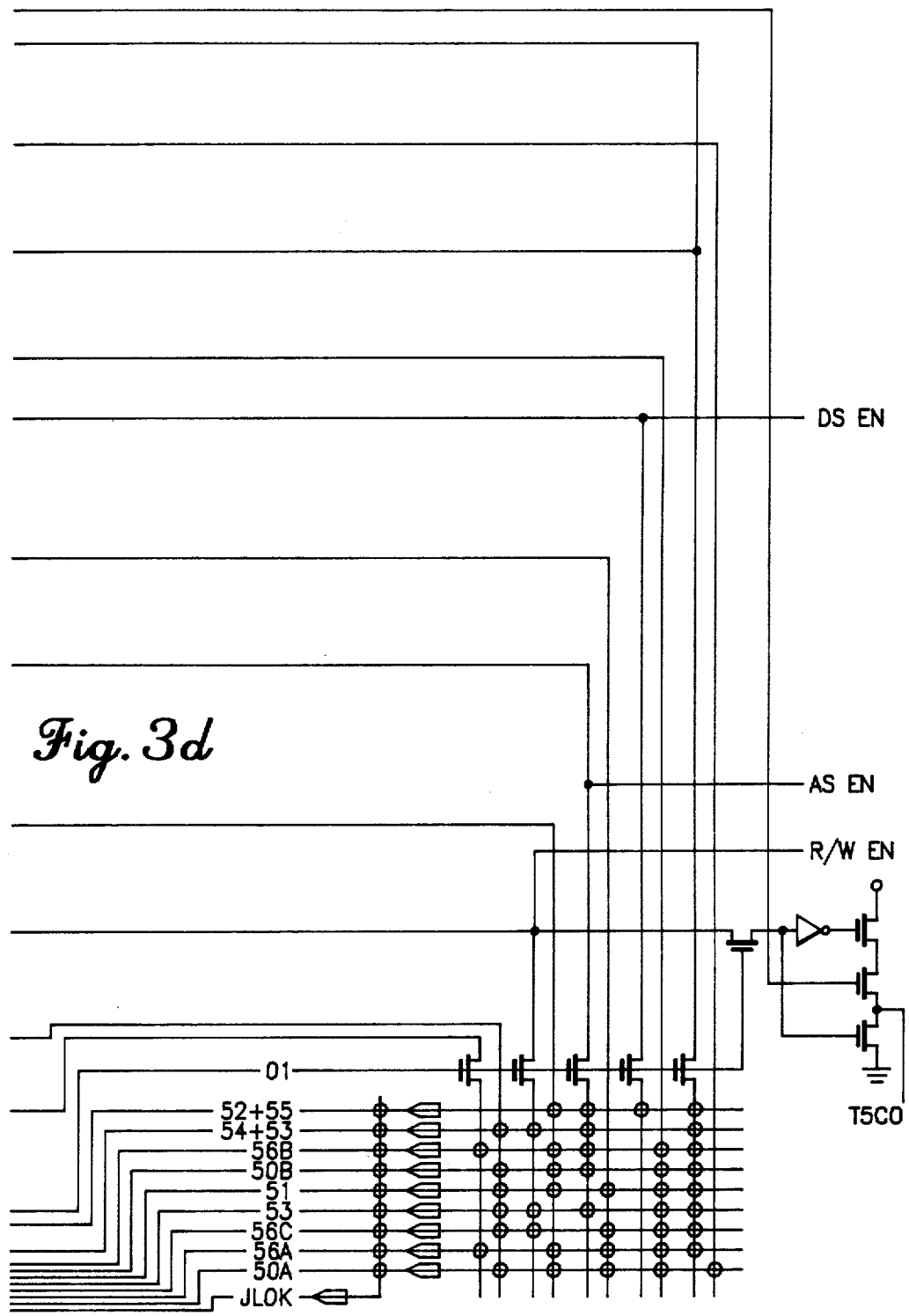

MICROPROCESSOR CAPABLE OF AUTOMATICALLY PERFORMING MULTIPLE BUS CYCLES

CROSS REFERENCE TO RELATED APPLICATIONS

Related subject matter can be found in U.S. Pat. No. 4,348,722 entitled "Bus Error Recognition For Microprogrammed Data Processor", filed Apr. 2, 1980 and assigned to the assignee of the present invention.

BACKGROUND OF THE INVENTION

1. Field of the Invention

This invention relates generally to microprocessors and, more particularly, to a microprocessor capable of automatically performing multiple bus cycles.

2. Description of the Prior Art

In general, microprocessors initiate a data transfer operation during an address phase of a bus cycle by providing via an address bus an access address to which a particular piece of peripheral equipment is uniquely responsive. The actual data exchange is thereafter performed during a data transfer phase of the bus cycle. Typically, the microprocessor must execute one or more additional instructions if more data must be exchanged. Thus, for example, if the microprocessor is capable of operating internally on say 16 bit operands but the data bus is only 8 bits wide, then each time a 16 bit operand must be exchanged with the memory equipment the microprocessor must execute the instructions necessary to perform two 8 bit transfer operations. Even in microprogrammed microprocessors which have substantially autonomous bus control logic, additional microinstructions are required to set up the internal routing of the second 8 bits, increment the access address to the next address, and instruct the bus control logic to perform the second bus cycle using the new address.

SUMMARY OF THE INVENTION

An object of the present invention is to provide a microprocessor capable of performing multiple bus cycles using the same control information.

Another object of the invention is to provide a microprocessor capable of performing multiple bus cycles without the execution of any additional instructions.

Still another object of the invention is to provide a microprocessor having bus control logic which will automatically perform multiple bus cycles in response to a single request of the central processor.

These and other objects are acheived in a microprocessor capable of communicating via a bus with peripheral equipment responsive to pre-assigned access addresses during a bus cycle, said microprocessor comprising: a control unit for generating a selected one of the access addresses and a set of bus logic control signals which characterize the bus cycle; a set of data buffers coupled to the control unit and the bus, for transferring data between the control unit and the bus in response to a data buffer enable signal; a set of address buffers coupled to the control unit and the bus, for transferring the selected access address to the bus in response to an address buffer enable signal; bus control logic coupled to the control unit and to the bus, for running the bus cycle in accordance with the set of bus logic control signals, including selectively generating the data and address buffer enable signals, and a set of bus control signals via the bus which control the use of the bus by the peripheral equipment; and bus cycle rerun control logic coupled to the bus and to the bus control logic, for forcing the bus control logic to rerun the bus cycle using the set of bus logic control signals, in response to receiving via the bus a rerun signal from the peripheral equipment requesting that the bus cycle be rerun; wherein means are provided in the control unit for generating a multi-cycle signal requesting that multiple bus cycles be run using the same set of bus logic control signals; means are provided in the data buffers for transferring the data between the bus and one of a predetermined number of destinations in the control unit selected via a data control signal; and means are provided in the bus cycle rerun control logic responsive to the multi-cycle signal, for forcing the bus control logic to run, in accordance with the set of bus logic control signals, each of the selected number of bus cycles in excess of one, for generating for each of the selected number of bus cycles in excess of one an incremented access address for output by the address buffers in response to the address buffer enable signal, and for selectively generating the data control signal while each of the predetermined number of bus cycles are being run. Preferably, the set of bus logic control signals are latched in the bus control logic to release the control unit.

BRIEF DESCRIPTION OF THE DRAWINGS

FIGS. 3A, 3B, 3C, and 3D comprise the schematic diagram of the portions of FIG. 2 which effect, or interact with, the present invention.

DESCRIPTION OF THE PREFERRED EMBODIMENT

Figure 1:
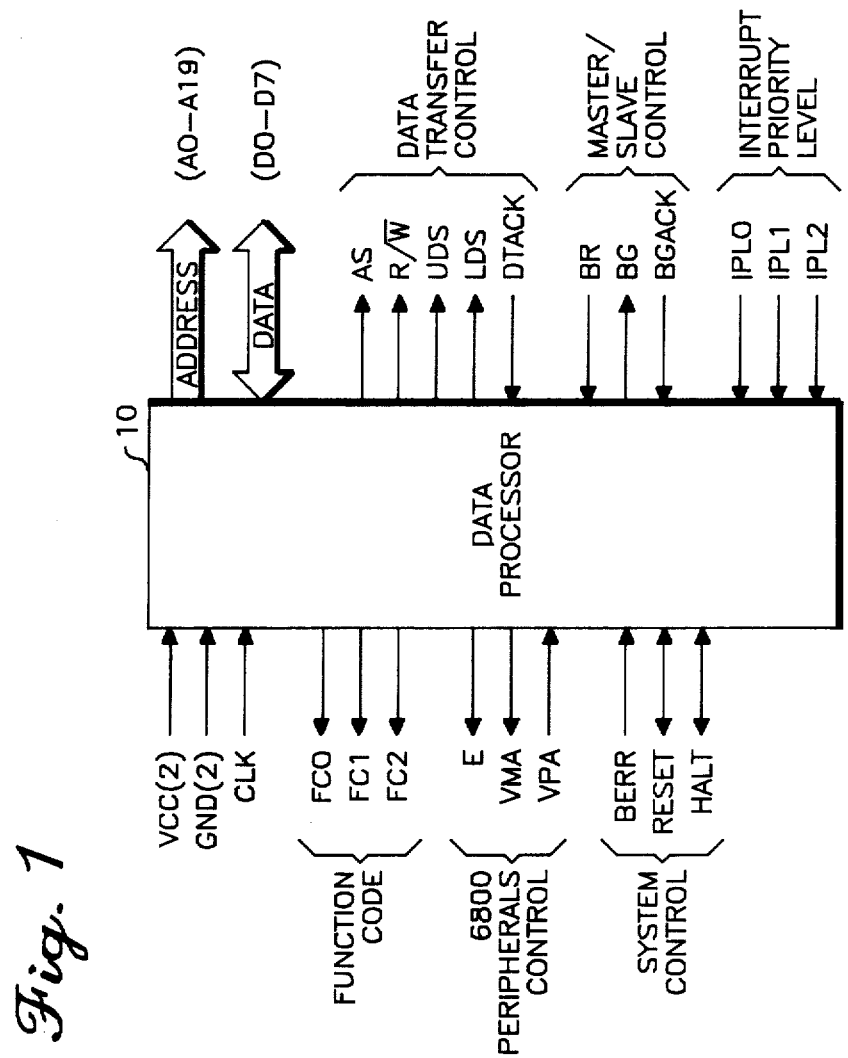
FIG. 1 is a functional pinout of a microprocessor having the present invention incorporated therein.

Shown in FIG. 1 is a microprocessor 10 which operates in synchronization with clock signals applied to a CLK pin, when power is applied to power pins VCC and GND. In general, the microprocessor 10 initiates a data exchange with peripheral equipment, such as a memory, by providing a uniquely assigned access address via an address bus (A0-A19), together with an address strobe (AS). If the microprocessor 10 requests data, via a read/write (R/W) signal, the peripheral equipment provides the data via a data bus (D0-D7) and signals the microprocessor to capture the data via a data transfer acknowledge (DTACK) signal. On the other hand, the microprocessor 10 may provide data on the data bus and request, via the R/W signal, that the data be received by the addressed peripheral equipment. In this case, the particular peripheral equipment will acknowledge the capture of the data via the data transfer acknowledge (DTACK) signal. In general, the nature of the data being transferred, e.g. data or instructions and supervisor or user, is indicated via a set of function code signals FC0-FC2. If the addressed peripheral is of the M6800 type, the microprocessor 10 exchanges the necessary handshake signals via an enable (E) signal, a valid memory address (VMA) signal, and a valid peripheral address (VPA) signal. If any peripheral device should need unscheduled servicing, the microprocessor 10 can be interrupted using a set of interrupt signals IPL0-IPL2. Errors which may have occurred during a particular bus cycle can be reported by the peripheral equipment via a bus error (BERR) signal, and, if desired, the peripheral equipment can request that the bus cycle be retried by simultaneously pulling a halt (HALT) signal low. System reset is initiated via a reset (RESET) signal, while sharing of the address/data buses with peripheral equipment designed to run bus cycles independently of the microprocessor 10 is coordinated using a bus request (BR) signal, a bus grant (BG) signal and a bus grant acknowledge (BGACK) signal.

Figure 2:
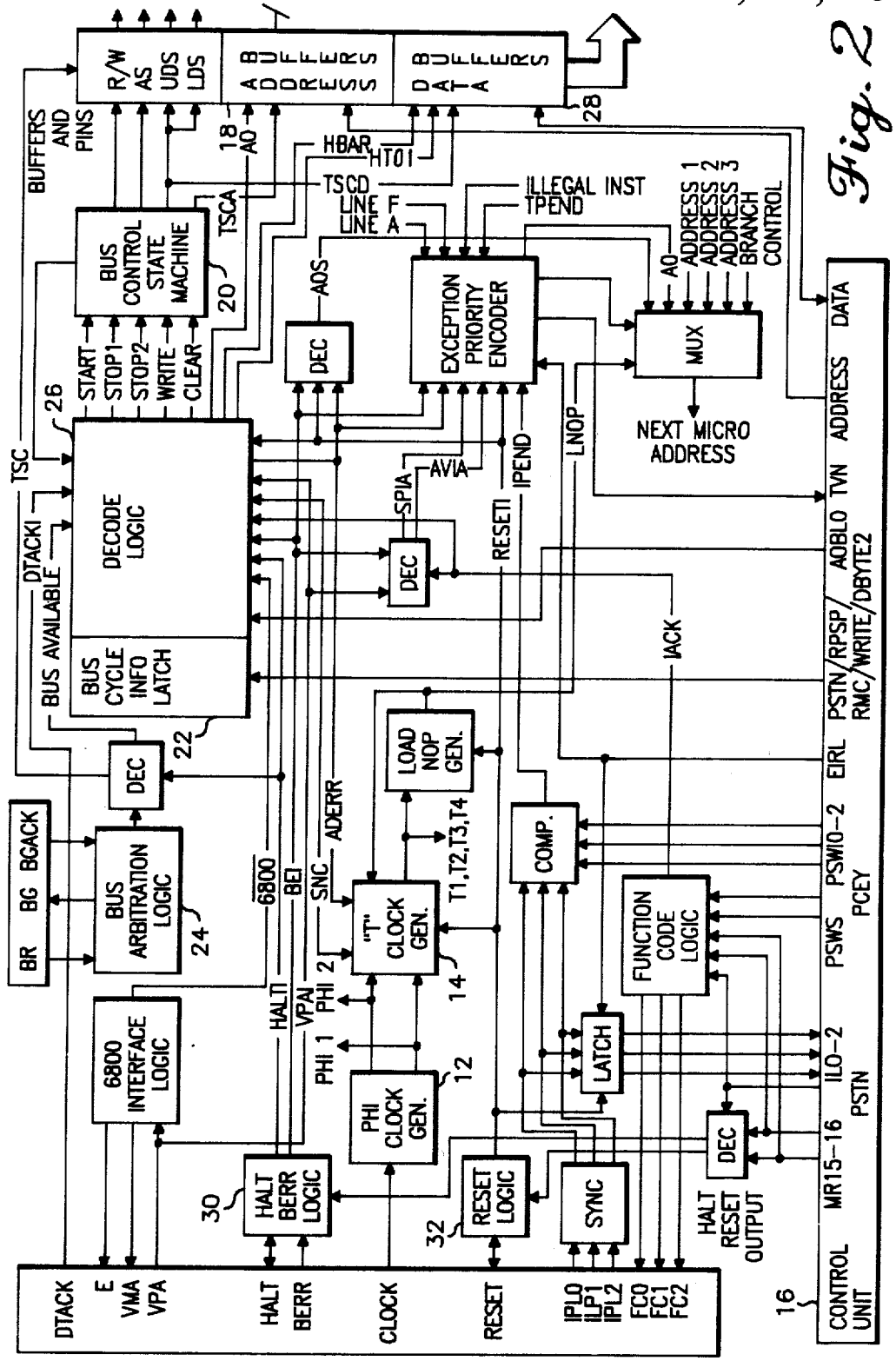
FIG. 2 is a block diagram representation of the microprocessor of FIG. 1.
Figure 3B:
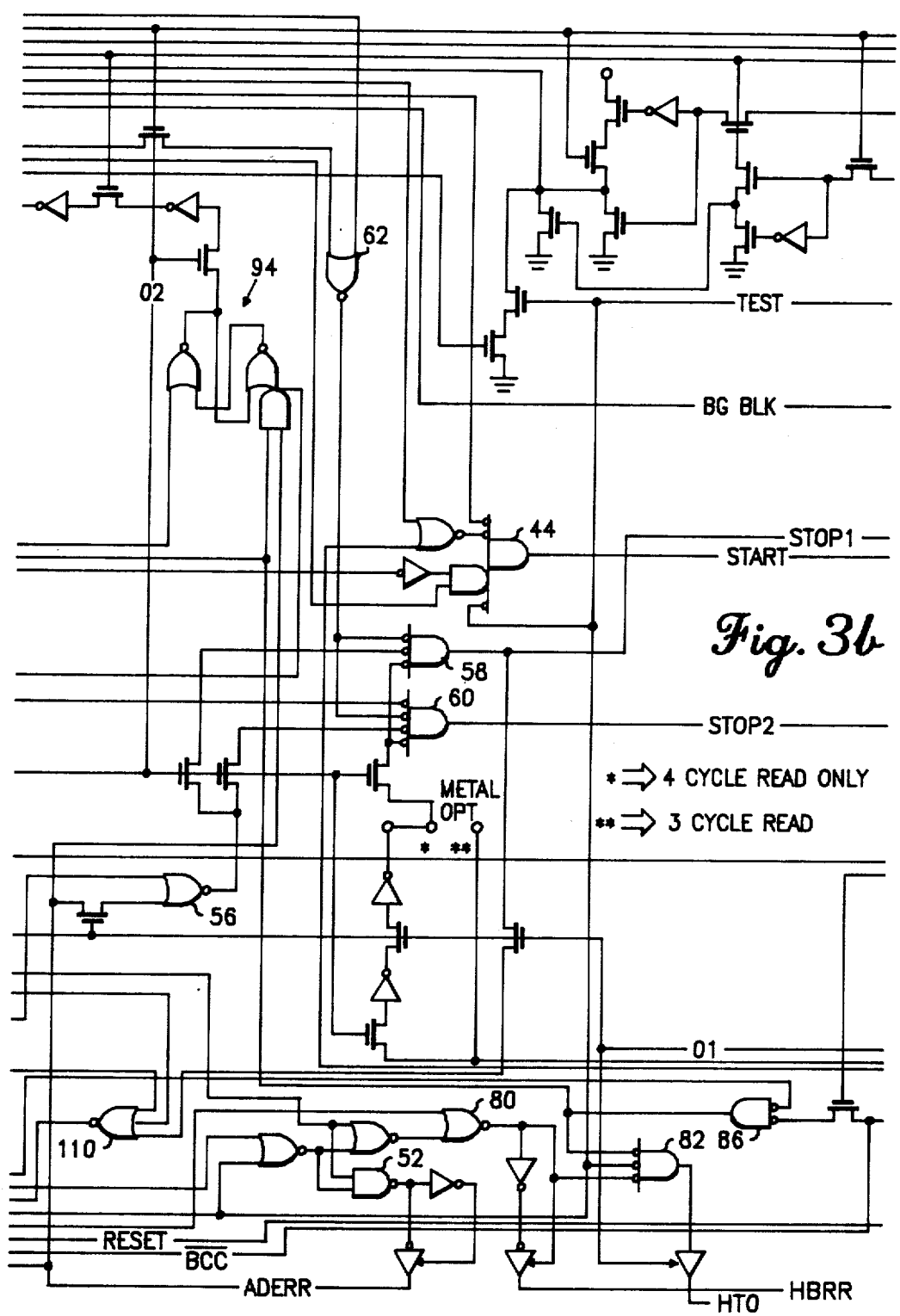

In the abbreviated form of the microprocessor 10 shown in FIG. 2, a clock generator 12 derives internal clock signals PHI1 and PHI2 from the clock (CLK) signal for use by the other circuitry of the microprocessor 10. For example, using the PHI1 and PHI2 clocks, a "T" clock generator 14 generates additional timing signals T1, T2, T3, and T4.

A control unit 16 initiates a bus cycle by generating a selected access address for output via a set of address buffers 18 to the peripheral equipment, and by providing a set of bus logic control signals which characterize the bus cycle to be run by the bus control state machine 20. Typically, the bus logic control signals would include signals indicating the direction of the data exchange (WRITE), the unit size of the data to be exchanged (DBYTE2), and whether the cycle is to be of the read-modify-write form (RMC). In the illustrated form, the bus logic control signals also include the low order address bit (AOBLO), a signal granting the bus control state machine 20 permission to start (PSTN) the requested bus cycle, and a signal granting the bus control state machine 20 permission to stop (RPSP) the bus cycle. If desired, several of the bus logic control signals may be latched into a set of bus cycle information latches 22 in order to release the control unit 16 while the bus control state machine 20 is running the requested bus cycle.

In general, when bus arbitration logic 24 indicates that the bus is available, decode logic 26 issues a START command to the bus control state machine 20, together with a WRITE signal which indicates whether the bus cycle is a read or a write. In response to these inputs, the bus control state machine 20 proceeds to enable the address buffers 18 to output the access address, and to provide the several bus control signals described above (R/W, AS and DS) which control the use of the bus by the peripheral equipment. When appropriate, the bus control state machine 20 also enables data buffers 28 to input or output the particular unit of data. When DTACK is received from the peripheral equipment during the read portion of a read-modify-write cycle, the decode logic 26 will issue a STOP1 signal instructing the bus control state machine 20 to complete the bus cycle but retain the bus upon returning to the idle state. Otherwise, the decode logic 26 will issue both STOP1 and STOP2 signals instructing the bus control state machine 20 to complete the bus cycle and release the bus upon returning to the idle state.

Should the peripheral equipment report a bus error (BERR) or request a rerun (BERR and HALT), HALT/BERR logic 30 will forward synchronized internal forms BEI and HALTI, respectively, to the decode logic 26. If a retry has been requested and the current operation is not a read-modify-write, the decode logic 26 will issue the STOP1 and STOP2 signals to instruct the bus control state machine 20 to terminate the bus cycle, and, after the peripheral circuitry releases the BERR and HALT signals, will issue a new START command to the bus control state machine 20 to rerun the cycle using the latched RMC and WRITE signals. Otherwise, the decode logic 26 will issue a CLEAR signal to reset the bus cycle information latches 22, and to force the bus control state machine 20 to terminate the bus cycle using a brief but orderly shutdown sequence.

Since the data bus is only 8 bits wide (D0-D7), data transfer operations between the microprocessor 10 and the peripheral equipment must be conducted in byte units. Internally, however, the microprocessor 10 is also capable of handling double byte or word units. Rather than require the control unit to issue two bus access requests to the decode logic 26 when a word transfer is desired, the decode logic 26 is designed to detect a word transfer request (i.e. DBYTE2 inactive) and, using the retry capability thereof, force the bus control state machine 20 to perform a second byte transfer using the bus cycle information which was previously latched in the bus cycle information latches 22 for the first byte of the word transfer. Simultaneously, the decode logic 26 increments the word access address provided by the control unit 16 to correspond to the access address of the second byte of the accessed word. In the preferred embodiment, this is conveniently achieved by forcing the low order address bit (AOBL0), which is always in the low state during a word access, to the high state.

If a system reset (RESET) is initiated, reset logic 32 will forward a synchronized form of the RESET signal to decode logic 26. Upon receiving the RESET signal, the decode logic 26 will terminate any pending bus cycle by issuing the CLEAR signal to both the bus control state machine 20 and the bus cycle information latches 22.

Figure 4:
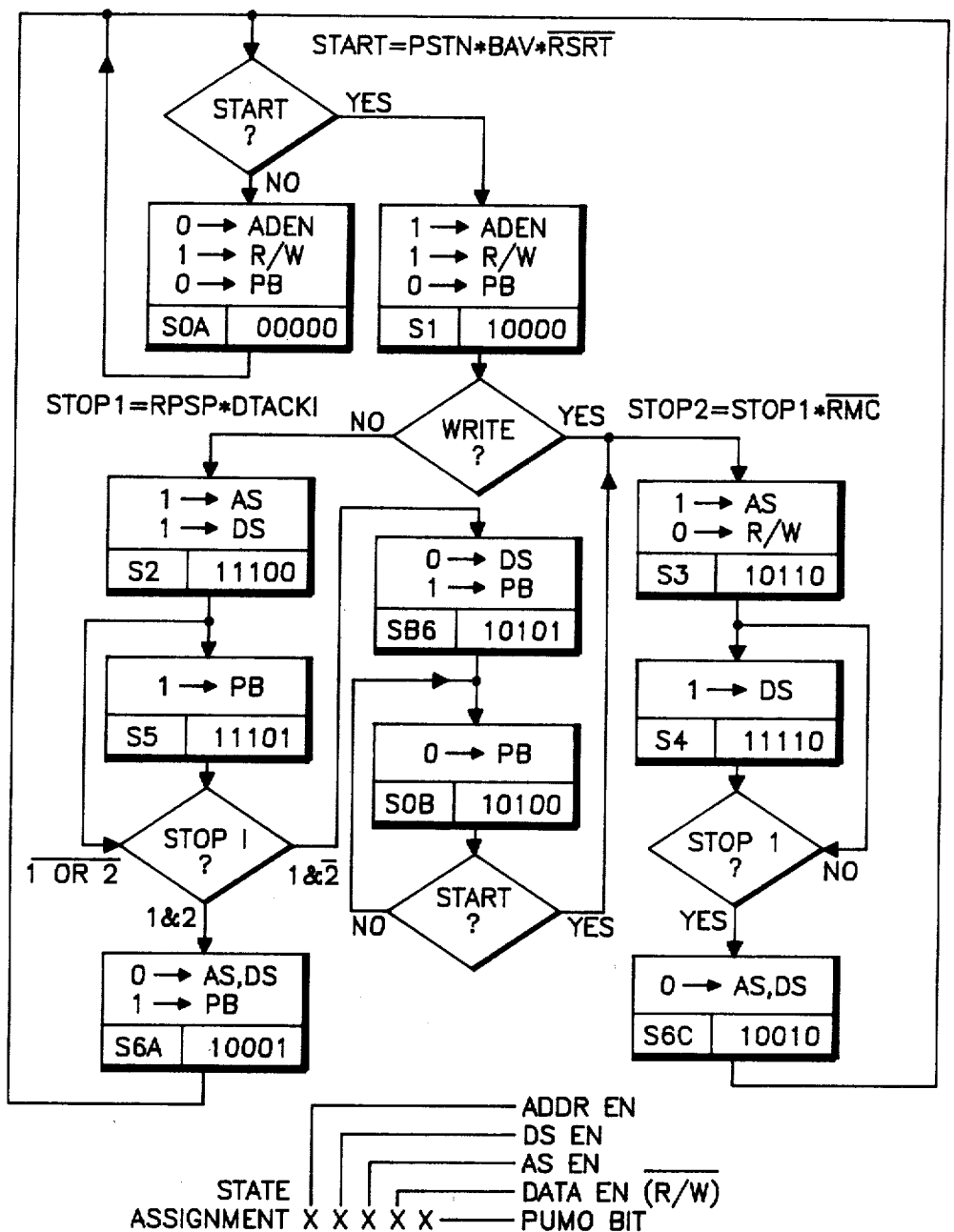
FIG. 4 is a logic state flow diagram of the bus control state machine of FIG. 2 as implemented in FIGS. 3C, and 3D.

Shown in FIGS. 3A-3D is one implementation of the bus control state machine 20, bus cycle information latches 22 and decode logic 26. Since a full understanding of the operation of the bus control state machine 20 can be readily obtained by simply referring to the logic state flow diagram shown in FIG. 4, the following will be directed primarily toward the operation of the decode logic 26.

In the bus cycle information latches 22 (shown in FIG. 2), a memory cycle pending (MCP) latch 34 is set in response to the control unit 16 issuing the PSTN signal granting permission for the bus control state machine 20 to run a bus cycle. A read-modify-write (RMC) latch 36 is set via a gate 38 when the particular bus cycle for which permission has been granted is the read portion of a read-modify-write (RMC) cycle. A write (WRITEL) latch 40 remembers whether the requested bus cycle is a write (set) or read (reset). Similarly, a byte (DBYTE) latch 42 remembers whether the bus cycle is to be of the single byte type (set) or the word type (reset).

In the decode logic 26 (shown primarily in FIGS. 3A and 3B), a gate 44 is initially enabled to issue the START signal to the bus control state machine 20 (shown primarily in FIGS. 3C and 3D) in response to the PSTN signal. Shortly thereafter, the MCP latch 34 assumes the duty of enabling the gate 44. Once the bus arbitration logic 24 indicates via a gate 46 that the bus is available, the gate 44 will actually issue the START signal and allow the bus control state machine 20 to generate the several bus control signals described above with respect to FIG. 1.

Since the bus cycle is of the asynchronous type, the bus control state machine 20 will continue the bus cycle until the decode logic 26 has detected all of the necessary conditions for terminating the current cycle. Typically, however, once the requested bus cycle has been started, the control unit 16 will issue the RPSP signal, granting permission to the decode logic 26 to complete the bus cycle once the other termination conditions have been detected. A stop (STOP) latch 48 in the bus cycle information latches 22 acknowledges the RPSP signal by issuing a STOP signal. A gate 50 assures that the STOP latch 48 will be set at the start of a write cycle, even if RPSP is not generated.

In the event that the low order address bit (AOBL0) (which only becomes valid shortly before the bus cycle has been initiated by the generation of AS) indicates a byte boundary access for a word type of access (i.e. DBYTE latch 42 is reset), a gate 52 will issue an address error (ADERR) signal. In response to the ADERR signal, the control unit 16 will be forced to branch to an appropriate address error handling routine. Simultaneously, a gate 54 will issue a STOP* signal to indicate that the current bus cycle should be terminated. The gate 54 will also issue the STOP* signal in response to a 6800 signal requesting termination of a 6800-type bus cycle which does not rely upon the return of DTACK.

In response to the setting of the stop latch 48 or upon the generation of the ADERR signal by the gate 52, a gate 56 will initially enable gates 58 and 60 to issue the STOP1 and STOP2 signals, respectively. Thereafter, in response to receiving the DTACK signal from the peripheral equipment or the STOP* signal from the control unit 16, a gate 62 will fully enable gates 58 and 60. If the current bus cycle is a normal read or write cycle, gates 58 and 60 will then actually issue the STOP1 and STOP2 signals only after the bus control logic 20 has reached a state appropriate to terminate such a cycle. On the other hand, if the current cycle is a read-modify-write cycle, i.e. the RMC latch 36 is set, only gate 58 will be allowed to issue the STOP1 signal once the bus control logic 20 has reached an appropriate state.

In response to receiving both the STOP1 and STOP2 signals, the bus control state machine 20 will complete the appropriate bus cycle termination sequence, release the bus, and issue a bus cycle complete (BCC) signal via a gate 64. However, if only the STOP1 signal is received, the bus control state machine 20 will not release the bus upon completing the termination sequence.

Normally, in response to the BCC signal, a gate 66 will issue a CLR signal to clear the MCP latch 34 via a gate 68, and the STOP latch 48 via a gate 70. However, if no address error has been detected and a gate 72 indicates that the peripheral circuitry is requesting a bus cycle rerun by simultaneously activating BERR and HALT and the RMC latch 36 is not set, then a gate 74 will issue a restart (RSRT) signal to disable the gate 66 from issuing the CLR signal. The RSRT signal will also disable the gate 44 from issuing the START signal for the requested bus cycle rerun until after the peripheral equipment has released the HALT signal. Once HALT has been released and RSRT goes inactive, the gate 44 will issue the START signal and force the bus control state machine 20 to rerun the bus cycle using the bus cycle information which was previously latched in latches 36, 40 and 42.

When permission is granted to start a bus cycle (i.e. PSTN goes active) and DBYTE2 is inactive indicating a word access, a gate 76 sets a first byte of word access (FBWA) latch 78 in the bus cycle information latches 22. In response to the setting of FBWA latch 78, gates 80 and 82 issue complementary data control signals HBAR and HT01, respectively, to enable the data buffers 28 to transfer the first byte of data between the data bus (D0–D7) and a high order byte portion of the control unit 16. At the completion of the first byte access bus cycle, a gate 84 will prevent gate 66 from clearing the MCP and STOP latches 34 and 48, respectively, in response to the BCC signal issued by gate 64. On the following PHI1 which is not also a T1 clock, a gate 86 will enable a gate 88 to clear the FBWA latch 78 via gate 76, disabling gate 84 and releasing gate 66. In the meantime, however, BCC has gone inactive, so that gate 66 is never allowed to issue the CLR signal. Upon again being granted the bus (i.e. BUS AVAIL goes active), the gate 44 will issue the START signal to the bus control state machine 20 to run the second byte access bus cycle just as if a retry had been requested. However, the cleared state of the FBWA latch 78 forces gates 80 and 82 to complement the data control signals HBAR and HT01, respectively, thus enabling the data buffers 28 to transfer the second byte of data between the data bus and a low order byte portion of the control unit 16. Simultaneously, a gate 90 enables a gate 92 to force the low order bit of the access address (AOBL0) to the high state, thus effectively incrementing the access address being provided by the control unit 16 for output to the peripheral equipment via the address buffers 18. In the event of an address error, the FBWA latch 78 is immediately reset via gate 76, and a complex gate 94 disables gate 90 to prevent the incrementing of the access address during the next bus cycle. Should a retry be requested by the peripheral equipment during the first byte access bus cycle, a gate 96 prevents gate 88 from clearing the FBWA latch 78, thus assuring that the retry cycle will be for the first byte. During an interrupt acknowledge bus cycle (i.e. IACK active), FBWA latch 78 is cleared via gate 76 and gate 92 is forced to increment the access address.

If a BEI signal is received without an accompanying HALTI signal by a gate 98, a gate 100 will enable a gate 102 to issue an internal reset (RESET') signal to immediately reset the MCP latch 34 via the gate 68 and the STOP latch 48 via the gate 70. Similarly, if a rerun is requested during a read-modify-write cycle, i.e. the RMC latch 36 is set, a gate 104 will enable the gate 98 to ignore the HALTI signal, thus allowing gate 100 to enable gate 102 to issue the RESET' signal. To force a normal bus termination during a 6800 type cycle, a gate 106 will disable the gate 98 and prevent the generation of the RESET' signal in response to the VPAI signal. The gate 100 will also enable the gate 102 to issue the RESET' signal in response to receiving the RESETI signal from reset logic 32. In response to the RESET' signal, a gate 108 issues the CLEAR signal to force the bus control state machine 20 to initiate the appropriate bus cycle termination sequence.

In the preferred form, the control unit 16 will assert the RPSP signal upon reaching a point in the instruction execution sequence which depends upon the completion of the current bus cycle. To halt the control unit 16 at this point, a gate 110 will assert a SNC signal in response to the STOP signal. The gate 110 will also assert the SNC signal the first PHI1 after gate 84 forces a bus cycle retry condition, to effect the transfer of the second byte of a word access. In response to the SNC signal, the "T" clock generator 14 will complete the current T-clock sequence and thereafter generate only a T4-T4BAR clock sequence. Since the control unit 16 begins a new operation only on a T1 clock, this effectively inhibits the execution of the control unit 16. Once the bus control state machine 20 is ordered to begin the bus cycle termination sequence via the STOP1 signal, the gate 110 will negate the SNC signal and allow the "T" clock generator 14 to resume generating the normal T-clock sequence.

Although the present invention has been described in the context of a particular embodiment, it should be appreciated that various changes may be made in the parts or elements of the preferred embodiment as disclosed herein without departing from the spirit and scope of the invention as set forth in the following claims.

We claim:

1. In a microprocessor capable of communicating via a bus with peripheral equipment responsive to pre-assigned access addresses during a bus cycle, the microprocessor comprising:

control means for generating a selected one of the access addresses and a set of bus logic control signals which characterize the bus cycle;

data buffer means coupled to the control means and the bus, for transferring data between the control means and the bus in response to a data buffer enable signal;

address buffer means coupled to the control means and the bus, for transferring the selected access address to the bus in response to an address buffer enable signal;

bus control means coupled to the control means and to the bus, for running the bus cycle in accordance with the set of bus logic control signals, including selectively generating the data and address buffer enable signals, and a set of bus control signals via the bus which control the use of the bus by the peripheral equipment; and bus cycle rerun control means coupled to the bus and to the bus control means, for forcing the bus control means to rerun the bus cycle using the set of bus logic control signals, in response to receiving via the bus a rerun signal from the peripheral equipment requesting that the bus cycle be rerun;

the improvement comprising:

means in the control means for generating a multi-cycle signal requesting that a selected number of bus cycles be run using the set of bus logic control signals;

means in the data buffer means for transferring the data between the bus and one of a predetermined number of destinations in the control means selected via a data control signal; and means in the bus cycle rerun control means responsive to the multi-cycle signal, for forcing the bus control means to run, in accordance with the set of bus logic control signals, each of the selected number of bus cycles in excess of one, for generating for each of the selected number of bus cycles in excess of one an incremented access address for output by the address buffer means in response to the address buffer enable signal, and for selectively generating the data control signal while each of the selected number of bus cycles are being run.

2. The microprocessor of claim 1 wherein the bus control logic means includes means for latching the set of bus logic control signals generated by the control unit, for use by the bus control logic in running and, as appropriate, rerunning the bus cycles.

3. The microprocessor of claim 1 or 2 wherein the bus cycle rerun control means includes means for allowing each of said selected number of bus cycles in excess of one to be selectively rerun in response to a respective rerun signal received from the peripheral equipment requesting such bus cycle be rerun.

4. In a microprocessor capable of communicating via a bus with peripheral equipment responsive to pre-assigned access addresses during a bus cycle, the microprocessor comprising:

control means for generating a selected one of the access addresses and a set of bus logic control signals which characterize the bus cycle;

data buffer means coupled to the control means and the bus, for transferring data between the control means and the bus in response to a data buffer enable signal;

address buffer means coupled to the control means and the bus, for transferring the selected access address to the bus in response to an address buffer enable signal; and bus control means coupled to the control means and to the bus, for running the bus cycle in accordance with the set of bus logic control signals, including selectively generating the data and address buffer enable signals, and a set of bus control signals via the bus which control the use of the bus by the peripheral equipment;

the improvement comprising:

means in the control means for generating a multi-cycle signal requesting that a selected number of the bus cycles be run using the set of bus logic control signals;

means in the data buffer means for transferring the data between the bus and one of a predetermined number of destinations in the control means selected via a data control signal; and means in the bus control means responsive to the multi-cycle signal, for forcing the bus control means to run, in accordance with the set of bus logic control signals, each of the selected number of bus cycles in excess of one, for generating for each of the selected number of bus cycles in excess of one an incremented access address for output by the address buffer means in response to the address buffer enable signal, and for selectively generating the data control signal while each of the selected number of bus cycles are being run.

5. The microprocessor of claim 4 wherein the bus control logic means includes means for latching the set of bus logic control signals generated by the control unit, for use by the bus control logic in running and, as appropriate, rerunning the bus cycles.

6. The microprocessor of claim 4 or 5 wherein the bus cycle rerun control means includes means for allowing each of said selected number of bus cycles in excess of one to be selectively rerun in response to a respective rerun signal received from the peripheral equipment requesting such bus cycle be rerun.

* * * * *